United States Patent
Ojard et al.

(10) Patent No.: US 7,056,574 B2
(45) Date of Patent: Jun. 6, 2006

(54) BOND LAYER FOR SILICON CONTAINING SUBSTRATE

(75) Inventors: Greg C. Ojard, Vernon, CT (US); Harry E. Eaton, Woodstock, CT (US); Shantikumar V. Nair, Sunderland, MA (US); Yasser A. Gowayed, Auburn, AL (US)

(73) Assignee: United Technologies Corporation, Hartford, CT (US)

( * ) Notice: Subject to any disclaimer, the term of this patent is extended or adjusted under 35 U.S.C. 154(b) by 446 days.

(21) Appl. No.: 10/443,343

(22) Filed: May 22, 2003

(65) Prior Publication Data

US 2004/0234740 A1 Nov. 25, 2004

(51) Int. Cl.
*F03B 3/12* (2006.01)
*B32B 9/04* (2006.01)

(52) U.S. Cl. .................. 428/293.4; 428/364; 428/446; 428/448; 428/336; 428/698; 416/241 B

(58) Field of Classification Search ............ 428/293.4, 428/364, 359, 446, 448, 701, 702, 336, 632, 428/633, 698; 416/241 B
See application file for complete search history.

(56) References Cited

U.S. PATENT DOCUMENTS

| 4,595,637 | A | | 6/1986 | Eaton et al. | |
|---|---|---|---|---|---|
| 4,992,318 | A | * | 2/1991 | Gadkaree | 428/114 |
| 6,254,935 | B1 | | 7/2001 | Eaton et al. | |
| 6,284,325 | B1 | | 9/2001 | Eaton, Jr. et al. | |
| 6,296,942 | B1 | | 10/2001 | Eaton, Jr. et al. | |
| 6,299,988 | B1 | | 10/2001 | Wang et al. | |
| 6,312,763 | B1 | | 11/2001 | Eaton, Jr. et al. | |
| 6,352,790 | B1 | | 3/2002 | Eaton et al. | |
| 6,365,288 | B1 | | 4/2002 | Eaton et al. | |
| 6,410,148 | B1 | | 6/2002 | Eaton, Jr. et al. | |
| 6,582,779 | B1 | * | 6/2003 | Li et al. | 427/585 |
| 2002/0025454 | A1 | | 2/2002 | Wang et al. | |

* cited by examiner

*Primary Examiner*—Jennifer McNeil
(74) *Attorney, Agent, or Firm*—Bachman & LaPointe, P.C.

(57) ABSTRACT

A bond layer and a further layer on the bond layer, the bond layer comprising a silicon layer having a dispersion of fibers, wherein at least some of the fibers extend between the bond layer and the further layer. The fibers are formed from a material selected from the group consisting of (1) alumina, (2) yttria, (3) aluminum silicate, (4) silicon carbide, (5) silicon nitride, (6) compounds of rare earth elements, alkaline earth elements, aluminum, silicon, oxygen, yttrium, nitrogen, niobium, tantalum, hafnium, zirconium, carbon and mixtures of (1) thru (6).

6 Claims, 2 Drawing Sheets

BOND LAYER FOR SILICON CONTAINING SUBSTRATE

BACKGROUND OF THE INVENTION

The present invention is drawn to an environmental barrier coating and, more particularly, an environmental barrier coating applied to a silicon containing substrate.

Silicon based ceramics exhibit accelerated oxidation rates in high temperature, aqueous environments such as for example, the combustor and turbine sections of gas turbine engines. In order to reduce the rate of oxidation on silicon based substrates used as ceramic components in such environments, significant effort has been given to providing environment barrier coating, i.e., barrier layer(s), for the silicon based substrates so as to increase the service life of such component parts.

With reference to FIGS. 1a and 1b, prior art environmental barrier coatings form a composite 10 comprising a silicon based substrate 12, a bond coat or layer 14 which comprises a dense continuous layer of silicon metal, a barrier layer 16 which comprises either an alkaline earth aluminosilicate based on barium and strontium, or a yttrium silicate and a top coat or layer 18 which comprises a refractory oxide and/or silicate or other metal oxide such as, for example, zirconium oxide. In addition, an intermediate layer 20 may be provided between the 14 bond coat and the barrier 16 and/or between the barrier layer 16 and top layer 18. The intermediate layer comprises, for example, a mixture of the barrier layer material with an additional oxide such as mullite. These prior art environmental barrier systems have proved to be protective with respect to oxidation of the silicon based substrate and, in addition, adherent. However, it has now been found that certain mechanical properties of the silicon substrate suffer as demonstrated by a significant reduction in 4-point bend strength at room temperature. It is believed that the loss of mechanical properties results from the cracking of the bond layer adjoining the silicon containing substrate which causes stress concentrations which initiate cracks in the substrate itself. The cracks in the bond coat or layer arise from many causes including differences in the coefficient of thermal expansion between the substrate and bond layer and stresses introduced as a result of rapid cyclic cooling and heating of the component parts.

Naturally, it would be highly desirable to provide an improved bond coat layer for silicon containing substrates which do not result in significant loss of mechanical properties.

Accordingly, it is a principle object of the present invention to provide an improved bond layer for an environmental barrier coating which overcomes the foregoing prior art problems.

SUMMARY OF THE INVENTION

The foregoing object is achieved by the present invention by providing an article comprising a silicon based substrate, a bond layer and a further layer on the bond layer, the bond layer comprising a silicon layer having a dispersion of fibers, wherein at least some of the fibers extend between the bond layer and the further layer. The fibers are formed from a material selected from the group consisting of (1) alumina, (2) yttria, (3) aluminum silicate, (4) silicon carbide, (5) silicon nitride, (6) compounds of rare earth elements, alkaline earth elements, aluminum, silicon, oxygen, yttrium, nitrogen, niobium, tantalum, hafnium, zirconium, carbon and mixtures of (1) thru (6).

A particular benefit of the present invention is that the fibers which extend across the boundaries between layers not only improves the fracture toughness of each of the layers per se but, also, add to the overall strength and toughness of the system at the boundary between the layers.

Further objects and advantages of the present invention will appear hereinbelow.

DETAILED DESCRIPTION

Figure 1A:
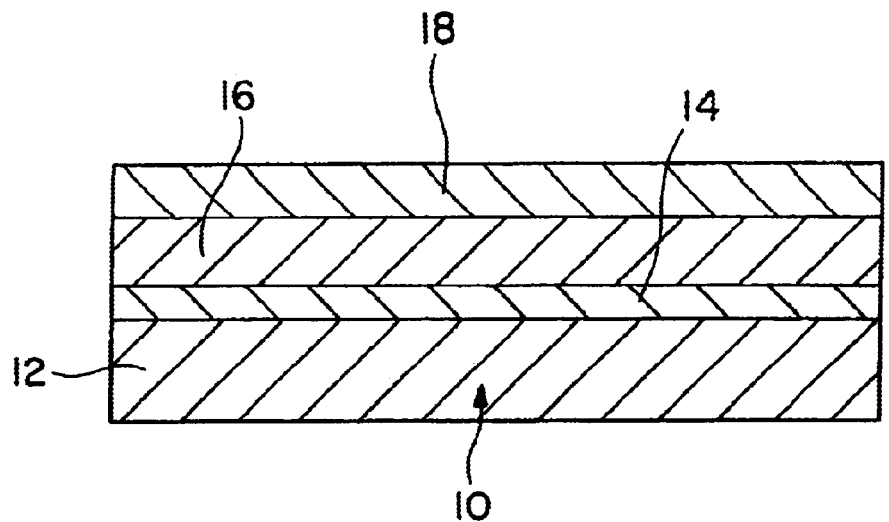
FIGS. 1a and 1b are schematic illustrations of composite articles in accordance with the prior art.
Figure 1B:
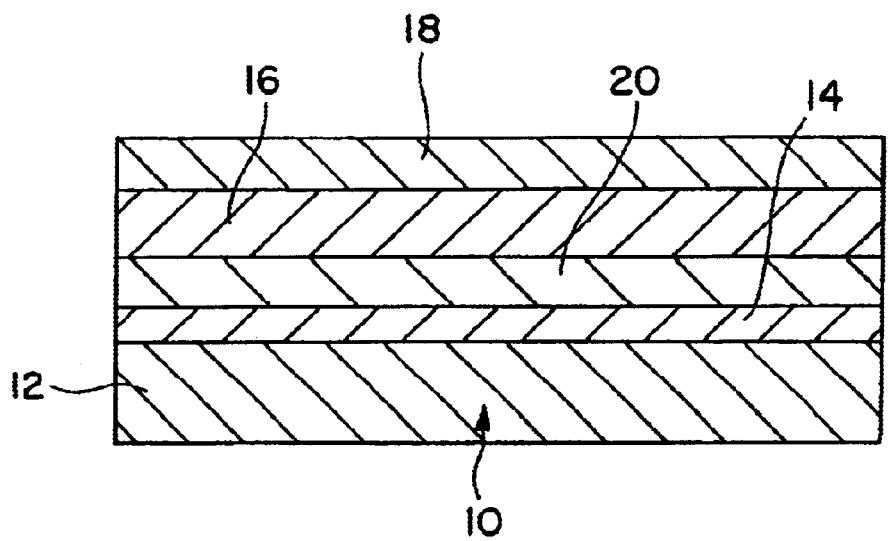
Figure 2:
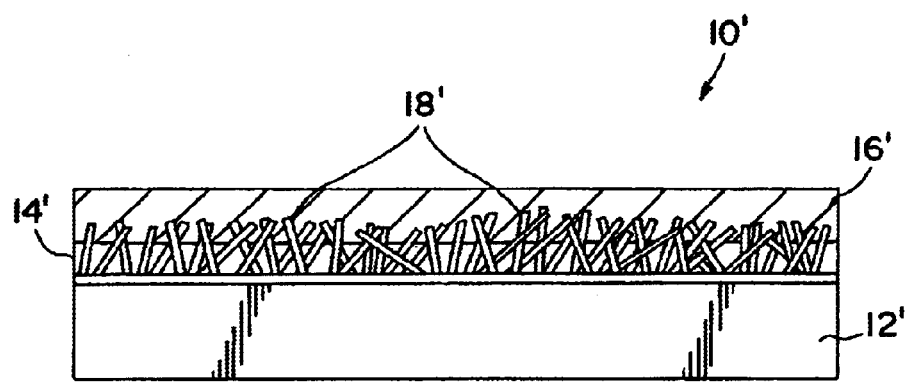
FIG. 2 is a schematic illustration of a composite article of the present invention.

The present invention, as seen in FIG. 2, relates to an article 10' comprising a silicon based substrate 12', a bond layer 14' and a further layer 16' on the bond layer. In accordance with the present invention, the bond layer 14' comprises a silicon layer having a dispersion of fibers 18' wherein at least some of the fibers extend between the bond layer and the further layer.

The silicon containing substrate may be a silicon ceramic substrate or a silicon containing metal alloy. In a preferred embodiment, the silicon containing substrate is a silicon containing ceramic material as, for example, silicon carbide, silicon carbide composites, silicon nitride, silicon nitride composites, silicon oxynitride and silicon aluminum oxynitride. In accordance with the present invention, fibers are dispersed in the bond layer wherein at least some of the fibers extend across the boundary between the bond layer and the further layer. The fibers are formed of a material selected from the group consisting of (1) alumina, (2) yttria, (3) aluminum silicate, (4) silicon carbide, (5) silicon nitride, (6) compounds of rare earth elements, alkaline earth elements, aluminum, silicon, oxygen, yttrium, nitrogen, niobium, tantalum, hafnium, zirconium, carbon and mixtures of (1) thru (6). The fibers have a mean length of between 10 to 5000 microns, preferably between 50 to 2000 microns and a mean diameter of 1 to 1000 microns, preferably between 5 to 100 microns. The fibers are present in the bond layer in an amount of between 10 to 90 vol. %, preferably between 40 to 75 vol. %. It is within the scope of the present invention to provide at least some of the fibers in the bond layer to extend between the bond layer and the further layer. In addition, the further layer could include a dispersion of fibers in addition to those which extend between the bond layer and the further layer. It is preferred, in accordance with the present invention, that at least 5 vol. % of the fibers dispersed in the bond layer extend between the bond layer and the further layer. The further layer may be a protective layer in an environmental barrier layer system, an intermediate layer or any other layer used in conventional environmental barrier layers. The bond coat may be applied directly to the silicon based substrate or, alternatively, a silicon oxide intermediate layer or other intermediate layer may be provided between the bond layer and the silicon containing substrate.

The fibers may be applied in any manner known in the prior art. A particularly useful process for applying the fibers is a process for plasma spraying as is disclosed in U.S. Pat. No. 4,595,637. U.S. Pat. No. 4,595,637, which is assigned to the assignee of the instant invention, is incorporated herein by reference.

The advantages for the article of the present invention include reduced cracking and improved adherence of the environmental barrier coating.

It is to be understood that the invention is not limited to the illustrations described and shown herein, which are deemed to be merely illustrative of the best modes of carrying out the invention, and which are susceptible of modification of form, size, arrangement of parts and details of operation. The invention rather is intended to encompass all such modifications which are within its spirit and scope as defined by the claims.

What is claimed is:

1. An article comprising a silicon based substrate, a bond layer and a further layer on the bond layer, the bond layer comprises a silicon layer having a dispersion of fibers wherein at least some of the fibers extend between the bond layer and the further layer, wherein the fibers are formed of a material selected from the group consisting of (1) alumina, (2) yttria, (3) aluminum silicate, (4) silicon carbide, (5) silicon nitride, (6) compounds of rare earth elements, alkaline earth elements, aluminum, silicon, yttrium, nitrogen, niobium, tantalum, hafnium, zirconium, carbon and mixtures of (1) thru (6).

2. An article according to claim 1, wherein the fibers having fibers have a mean length of 10 to 5000 microns and a mean diameter of 1 to 1000 microns.

3. An article according to claim 2, wherein the fibers are present in an amount of between 10 to 90 vol. %.

4. An article according to claim 1, wherein the fibers having fibers have a mean length of 50 to 2000 microns and a mean diameter of 5 to 100 microns.

5. An article according to claim 4, wherein the fibers are present in an amount of 40 to 75 vol. %.

6. An article according to claim 1, wherein at least 5 vol. % of the fibers extend between the bond layer and the further layer.

* * * * *